United States Patent [19]

Wader

[11] Patent Number: 4,512,736
[45] Date of Patent: Apr. 23, 1985

[54] APPARATUS FOR THE EXPANSION OF MINERAL MATTER, ESPECIALLY PERLITE AND VERMICULITE

[75] Inventor: Heribert Wader, Herdecke, Fed. Rep. of Germany

[73] Assignee: Deutsche Perlite GmbH, Dortmund, Fed. Rep. of Germany

[21] Appl. No.: 450,758

[22] Filed: Dec. 17, 1982

[30] Foreign Application Priority Data

Dec. 23, 1981 [DE] Fed. Rep. of Germany ....... 3151164

[51] Int. Cl.³ .................... F27B 15/00; F27B 14/00
[52] U.S. Cl. ......................................... 432/58; 432/13
[58] Field of Search .............. 432/13, 58; 252/378, 252/378 P

[56] References Cited

U.S. PATENT DOCUMENTS

| 2,421,902 | 6/1947 | Neuschotz | 432/13 |
| 2,435,927 | 2/1948 | Manning et al. | 241/17 |
| 2,521,179 | 9/1950 | Mitchell | 432/58 |
| 2,621,034 | 12/1952 | Stecker | 432/13 |
| 2,676,892 | 4/1954 | McLaughlin | 432/13 |
| 2,838,881 | 6/1958 | Plumat | 432/13 |
| 3,118,658 | 1/1964 | Dennert | 432/13 |
| 4,176,010 | 11/1979 | Dudek et al. | 432/13 |
| 4,347,155 | 8/1982 | Jenkins | 432/58 |

FOREIGN PATENT DOCUMENTS 2042896 8/1970 Fed. Rep. of Germany.

*Primary Examiner*—John J. Camby
*Attorney, Agent, or Firm*—Karl F. Ross; Herbert Dubno

[57] ABSTRACT

Perlite and vermiculite are blown by injecting the particles, entrained in a carrier gas, through a burner at the bottom of a fluidized bed furnace, into the latter with, within and codirectionally with the flame to ensure uniformity of the product.

3 Claims, 4 Drawing Figures

APPARATUS FOR THE EXPANSION OF MINERAL MATTER, ESPECIALLY PERLITE AND VERMICULITE

FIELD OF THE INVENTION

My present invention relates to an apparatus for producing expanded perlite, vermiculite and other mineral matter by subjecting the same to elevated temperatures.

BACKGROUND OF THE INVENTION

It is known that certain mineral matter, especially perlite or vermiculite, can be expanded or blown by subjecting the particles thereof to elevated temperatures.

Apparatus for this purpose can comprise a fluidized bed shaft-type furnace, at least one burner for introducing a fuel and combustion sustaining air into the fluidized bed furnace, and means for introducing particles of the mineral matter to be blown into the fluidized bed whereby the interaction between the heat in the fluidized bed and the particles causes the particles, while they are circulating in the fluidized bed, to expand.

Generally, the burner opens into a lower portion of the fluidized bed shaft while the particle-feed device introduces the particles into the fluidized bed at a location well above the burner, e.g. from a feed tube or the like.

The fluidized bed may be of the so-called expanded type whereby the gas stream, emerging from the top of the bed, entrains the expanded perlite or vermiculite particles from the bed or shaft.

Downstream of the shaft, these particles can be separated from the gas stream and collected.

For the most part, the burner also serves to supply to the furnace, the fluidizing air or gas which generates the fluidized bed movement within the shaft and upwardly along the latter to the outlet.

The shaft can have a height of several meters and the particles are generally fed into the shaft in the lower half of the bed.

Initially, these comparatively dense particles engage in a free fall in which they move counter to rising currents of hot gas above the flame. Ultimately they are circulated into the region of the flame and expanded. Prior to expansion and the desired degree of contact with the flame, however, they may be entrained upwardly, turned, fall downwardly, turned, are carried upwardly a number of times. The interaction is thus a function of the aerodynamic characteristics and statistical variations.

Experience has shown that, for a given output or throughput of the mineral matter, considerable energy is wasted, presumably because of ineffective movement of the particles between the time they are introduced and the time they interact with the flame or in the bed. Furthermore, because the interaction depends in large matter on statistical circumstances and aerodynamic factors, the product which is obtained is frequently nonuniform. This may be a result of the repeated subjection of the particles to severe thermal gradients, in part the result of widely varying residence times in the fluidized bed and like differences. The product, therefore, is generally considered to have poor quality since the apparent density of the product and the pore volume or porosity may vary. The problem is especially acute because a sharp temperature rise, which is necessary for expansion of vermiculite or perlite, cannot always be assured for all particles.

In one earlier system (German open application No. 20 42 896) by a corresponding feed of combustion air in the burner, a turbulent flow of the combustion gases can be generated to provide, in the downwardly conical tapering fluidized bed furnace, a condition in which the mineral matter rides along the wall of the furnace until it reaches the conical region where the particles are picked up by the turbulent flow.

The use of a turbulent stream in this fashion is intended to bring about a more uniform treatment of the mineral matter, but here also individual particles may be subjected to sharply different heating patterns and thus give rise to blown products of varying quality.

In this earlier system, the gases and particles move especially in the coincal region as in a cyclone so that the heavier particles are thrown outwardly and thus are subjected to a different treatment from the lighter particles.

Similar problems with the system are described in U.S. Pat. No. 2,435,927 in which, moreover, the combustion gas and particles are introduced together into the cylindrical portion in a parallel flow, only thereafter entering the turbulent flow.

OBJECTS OF THE INVENTION

It is the principal object of the present invention to provide an apparatus for the production of blown perlite or blown vermiculite which is more apt to ensure a uniform treatment of all particles in earlier systems and thus can more reliably bring the particles through a substantially predetermined temperature jump in a uniform and reproducible manner.

Another object of this invention is to provide an improved method of operating an apparatus for the blowing of perlite, vermiculite or like mineral matter.

SUMMARY OF THE INVENTION

These objects and others which will become apparent hereinafter are attained, in accordance with the present invention, in an apparatus which comprises a fluidized bed shaft formed with a burner at substantially the apex of a frustoconical tapering lower end and provided with a feed tube for supplying the mineral particles, the carrier gas and the fluids for generating the flame at the burner and in a codirectional flow with the flame.

In other words, in accordance with the present invention, means is provided for generating a flame which preferably is directed upwardly along the axis of the furnace while further means is provided for feeding the particle-carrier gas mixture codirectionally with this flame through the burner, the burner ducts therefore including means for feeding the particulates to one of the burner fluids.

According to an important feature of the invention, the feed duct for the particle-carrier gas mixture opens axially into the burner and is surrounded by the means for building the flame thereof.

The latter means can include means for introducing the fuel and the combination air into the burner coaxially with the outlet for the mixture.

When the burner is a gaseous fuel burner, the fuel nozzle is provided as an annular structure surrounding the central tube through which the particle-carrier gas mixture is fed and, additionally, surrounding a further duct through which the combustion-sustaining gas may be introduced. In an alternative and more preferred construction, the outer annular nozzle of the burner feeds the combustion sustaining gas thereto while the intermediate nozzle delivers the fuel gas and the innermost axial nozzle feeds the particles in the carrier gas mixture.

When the fuel is oil, a crown of oil burner nozzles can surround the tube delivering the particle-carrier gas mixture.

Of course, it is also possible to provide an inverse system in which the particle-carrier gas mixture is fed from one or more ducts surrounding the flame-forming means. For example, a central oil-feed nozzle can be provided and can be surrounded by the air duct and then by the duct delivering the particle-carrier gas mixture.

When the duct delivering the particle-carrier gas mixture is the central duct of the assembly, its free end preferably projects beyond the flame-forming means in the burner and is outwardly flared.

Surprisingly, with the system of the invention, all of the particles traverse the flame similarly and even identically so that all are subjected to the same degree of thermal shock and hence to the same temperature jump so that, if one plots the temperature of the particles against time, the characteristic curve shows a temperature increase with steep flanks.

In addition, with the system of this invention, the residence time of the particles is more or less uniform and heavier particles are not subjected to a different treatment from light particles because of the cyclonic effect. The quality of the product is therefore more uniform with less variation.

A highly important advantage is that the overall height of the fluidized bed furnace can be reduced and the apparatus operated with lower energy comsumption especially when the carrier gas is air, preferably preheated air, and wherein the combustion air is also preheated. Both of these fluids are preferably preheated to about 800° C.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
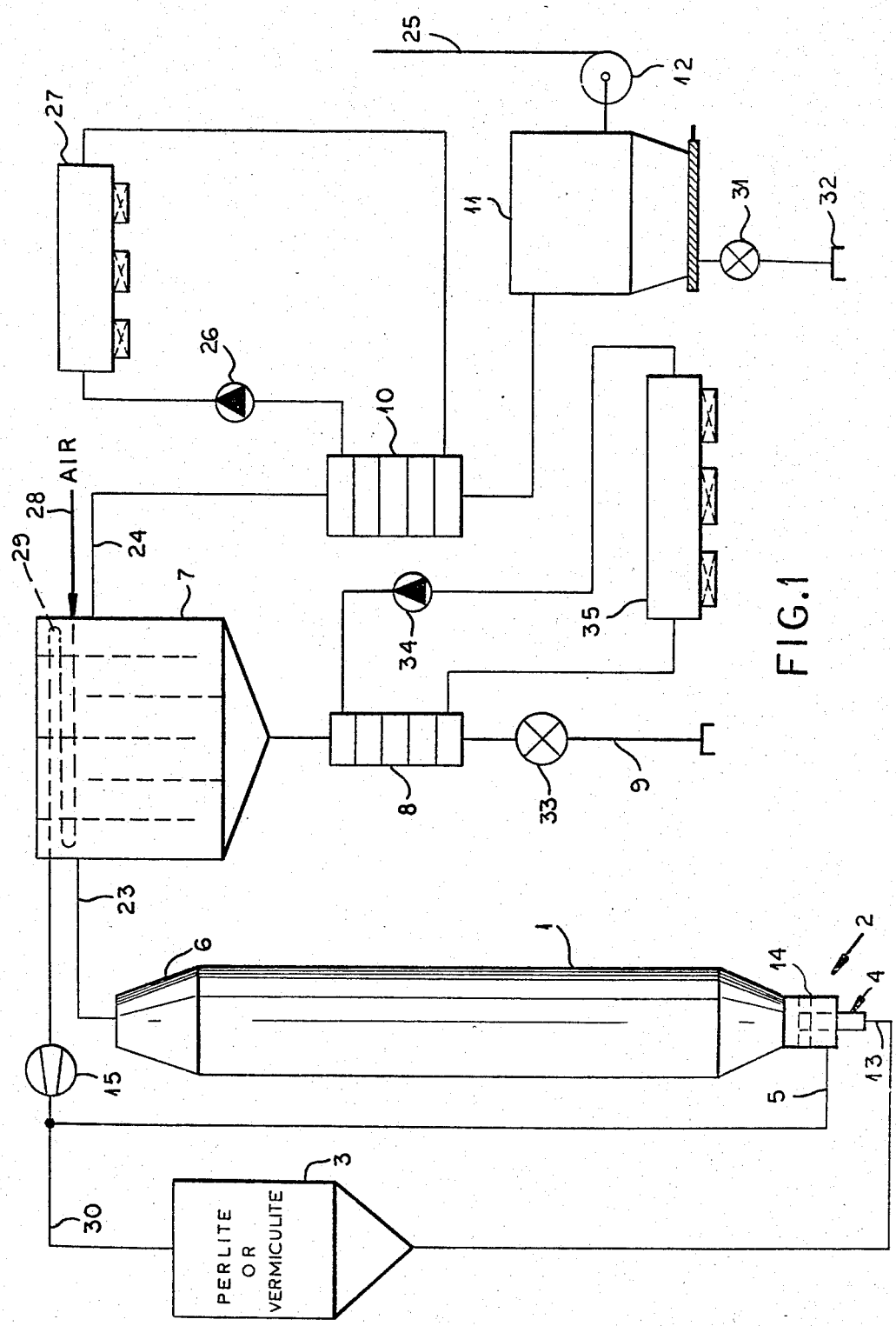
FIG. 1 is a flow diagram illustrating the invention.

The apparatus shown in FIG. 1 is intended for the blowing of perlite or vermiculite which subjects the particles contained in a hopper 3 to a sharp temperature rise in accordance with conventional mineral blowing technology.

Basically the apparatus comprises a fluidized bed shaft 1, a burner 2 and the hopper 3 which serves as a feeder for delivering the particulate mineral matter to the shaft 1.

Figure 2:
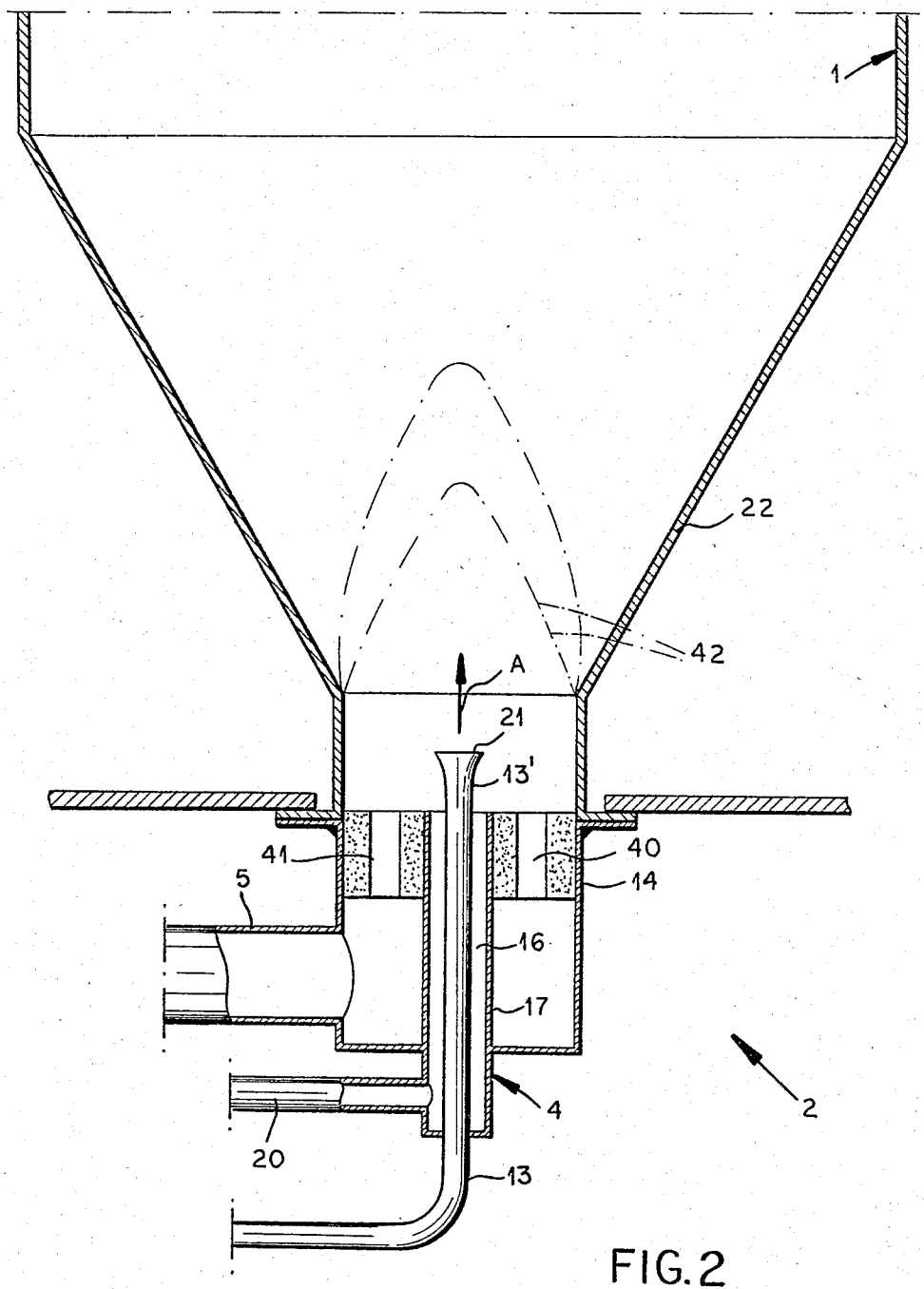
FIG. 2 is a detail view of the burner in one embodiment of the invention.

According to the invention, as can be seen from FIG. 2, for example, the burner 2 can comprise an air inlet 14 receiving air from a supply line 5, a fuel line or nozzle 4 which is coaxially surrounded by the air inlet and is connected to a fuel supply line, such as the gas line 20, and a line 13 having an outlet 21 opening into the frustoconical bottom 22 of the shaft 1 for delivering a particle-carrier mixture to the burner.

Within the furnace shaft 1, an expanded fluid bed of particles is maintained, the particles being constituted of expanded mineral particles from the hopper 3. The particles are entrained by the fluidizing gas via a duct 23 from the head 6 of the shaft 1 into a separating chamber 7 in which the particles are permitted to settle and the particle-free gas is collected at 24 and fed through a cooler 10 where it passes in indirect heat exchange with a cooling fluid. The gas is then passed through a gas-cleaning apparatus represented at 11, e.g. a filter, electrostatic precipitator or the like, and is discharged into the atmosphere at 25 by a blower 12 which draws the gas through the cleaning unit.

The cooling circuit comprises a circulating pump 26 and a heat exchanger 27 from which usable heat can be recovered. The heat exchanger 27 can be a waste heat boiler or the like supplying the steam for other plant purposes.

The combustion sustaining air can be preheated by feeding it at 28 to a heat exchanger loop 29 within the separator 7, the preheated air, e.g. at a temperature of 800° C. or above, being fed to the line 5 and to a line 30 delivering this preheated air as the carrier gas to the particle feed 3 so that the particle-carrier gas mixture is formed in line 13.

The particles from the gas cleaner 11 can be discharged by a gate or metering device 31 to a collector 32. The outlet of blower 12 is wholly connected to a stack for venting the cleaned gas. The blown perlite or blown vermiculite particles collected in the separator 7 are passed through a cooler 8 and then metered at 33 to a discharge pipe 9.

The cooler 8 is in a direct heat exchanger through which the coolant is circulated by a pump 34 through another waste heat boiler 35.

In the system of the invention, the mineral particles, i.e. the particles of perlite or vermiculite, are fed codirectional with the flame propagation direction (arrow A in FIG. 2) directly within the flame which is formed as fuel gas from an inlet 17 which mixes with combustion air from line 5.

For this purpose the burner is provided with a central inlet 13' having the outwardly flared end 21 and connected to the pipe 13 for delivering the particle-carrier gas mixture into the core of the flame and projecting this mixture through the flame so that the particles move in the flame propagation direction.

The central member 13' is here surrounded by a tube 17 forming an inlet nozzle for the fuel, in this case natural gas, in an auxiliary around the inlet for the particle-carrier gas mixture. The nozzle has been represented at 4.

Surrounding the nozzle is a further coaxial duct 14 which serves to feed the combustion air into the burner around the gas nozzle, preferably through a multiplicity of ports 40 in a ceramic body 41 from which the flame extends upwardly with an outline, for example, as represented by the dot-dash lines 42.

Figure 3:
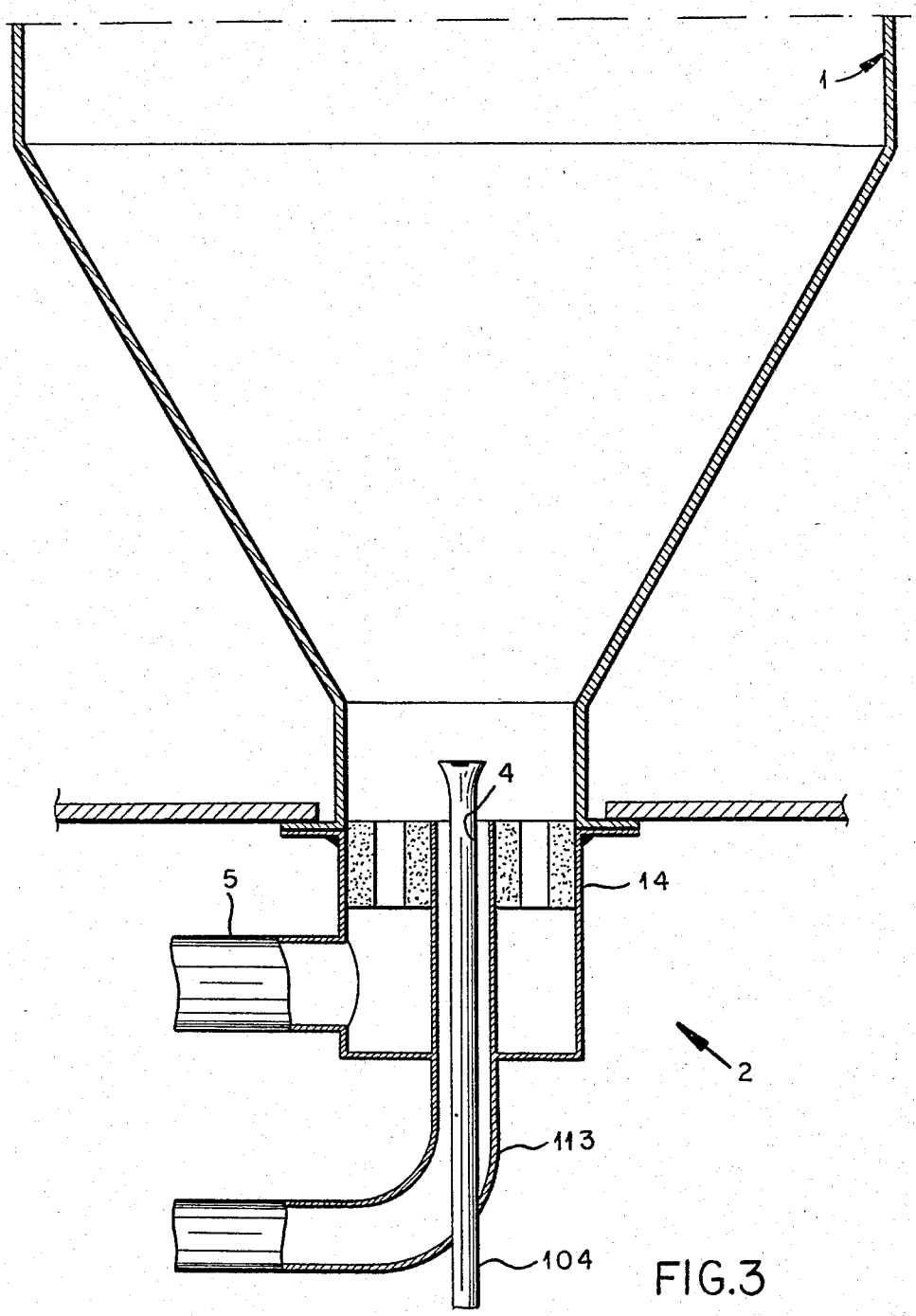
FIG. 3 is a view similar to FIG. 2, illustrating another embodiment thereof.

In the embodiment of FIG. 3, which operates with fuel oil, a central oil nozzle 104 is provided and is coaxially surrounded by the tube 113 for supplying the particle-carrier gas mixture. The latter is here surrounded by the combustion air supply 5, 14 as in the embodiment of FIG. 2.

Figure 4:
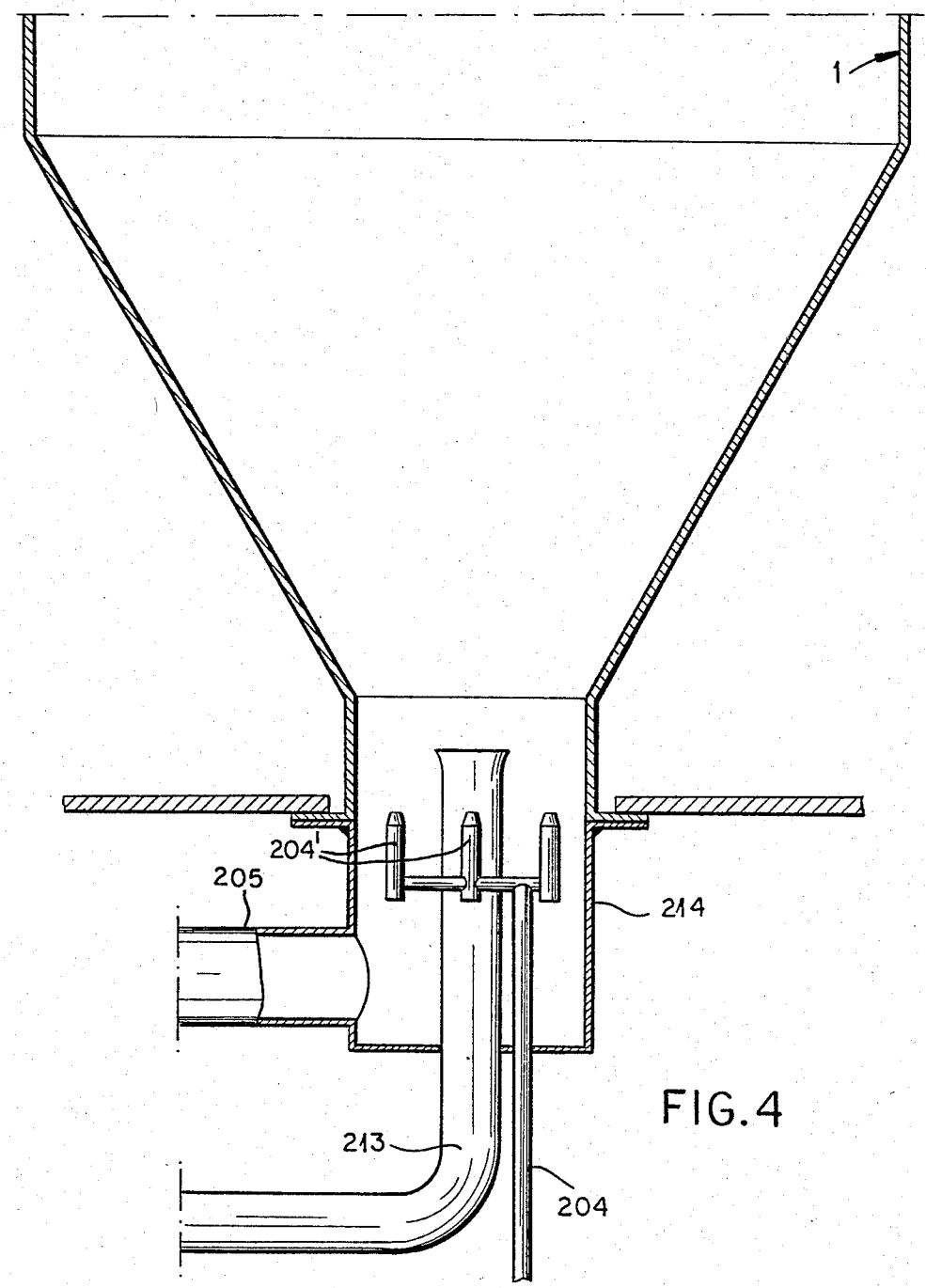
FIG. 4 is a similar view of still a third embodiment of the invention.

Still another embodiment has been shown in FIG. 4. In this arrangement, the gas-particle mixture is fed via the duct 213 into a burner while the air supply for combustion is delivered by the pipe 205 and the duct 214. In this embodiment, however, the fuel line 204 communicates with an annular array of fuel nozzles 204' which surround the duct 213.

I claim:

1. An apparatus for the expansion of particles of a mineral such as perlite and vermiculite, comprising:
   means forming an upwardly extending fluidized-bed furnace for expanding said particles;
   a burner opening into a lower end of said furnace for generating a flame therein, said furnace being closed at said lower end except for said burner; and
   a pipe opening upwardly into said furnace at said lower end for feeding a mixture of said particles and a carrier gas into said flame whereby said particles pass generally in the direction of propagation of said flame through said flame into said furnace, said burner opening axially from below into said furnace and consisting of an annular fuel inlet duct coaxially surrounding said pipe and directed upwardly into said furnace, a combustion air duct opening axially upwardly into said furnace and at least one fuel inlet and coaxially surrounding said fuel inlet assembly, means for feeding fuel exclusively to said fuel inlet duct and means for feeding exclusively air to said combustion air duct, and said combustion air duct being formed with a ceramic ring around said fuel inlet duct and provided with a plurality of spaced apart axially extending bores opening into said furnace and parallel to said pipe and said fuel inlet duct, said ring having a planar horizontal upper surface, said pipe projecting upwardly beyond said surface.

2. The apparatus defined in claim 1, further comprising:
   means for receiving a mixture of particle and combustion gases from the top of said furnace and for separating same into a waste gas and a solid product;
   means for passing said solid product in a heat exchange with a circulating fluid to cool said product;
   means for extracting waste heat from said waste gas; and
   means for cleaning said waste gas and discharging same.

3. The apparatus defined in claim 2, further comprising means for heating said combustion air and said carrier gas in indirect heat exchange with a mixture of particles and combustion gas.

* * * * *